UNITED STATES PATENT OFFICE.

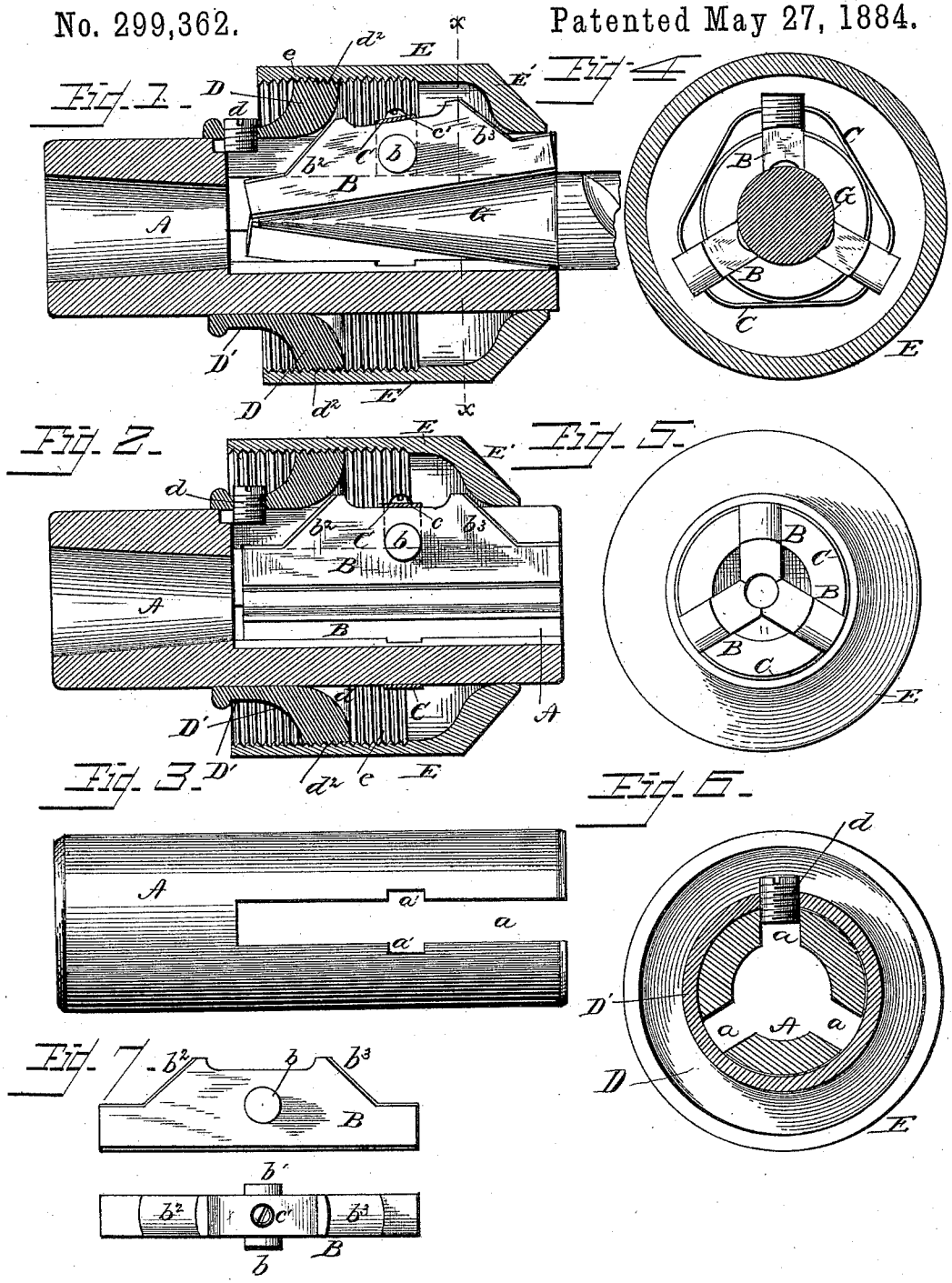

AUGUSTUS E. ELLINWOOD, OF AKRON, OHIO, ASSIGNOR OF TWO-THIRDS TO LEWIS MILLER AND HENRY YOUNG, BOTH OF SAME PLACE.

CHUCK.

SPECIFICATION forming part of Letters Patent No. 299,362, dated May 27, 1884.

Application filed December 1, 1883. (No model.)

*To all whom it may concern:*

Be it known that I, AUGUSTUS E. ELLINWOOD, of Akron, county of Summit, and State of Ohio, have invented a new and useful Improvement in Chucks and Tool-Holders, of which the following is a full, clear, and exact description, reference being had to the accompanying drawings, making part of this specification.

My invention relates to an improvement in that class of chucks or tool-holders described in Letters Patent granted to me June 21, 1881, and has for its object the covering of the operative parts of the chuck and protecting them from dust or dirt, the removal of all adjusting screw-threads from the mandrel and jaws, the construction of the jaws for giving them increased strength, the pivoting of the jaws in the mandrel for facilitating their adaptation to the bit or shank applied thereto, and the adjustment of the jaws.

It consists, first, in the combination, with the mandrel and its jaws, of two sleeves for adjusting the jaws, one covering and protecting the other and the jaws operated by said sleeves; in the manner of effecting the adjustment of the sleeves in opposite directions upon the mandrel for adjusting the jaws by the rotation of the outer covering sleeve, nut, or shell; in a novel arangement of the cam-faces or inclined shoulders of the jaws, whereby increased strength is given to the latter at their central portions, where it is required; in a novel manner of pivoting the jaws in the mandrel; in the manner of applying a spring or springs to the jaws for adapting them to yield, and at the same time insuring their proper centering upon the bit or shank which may be applied to them, and in certain details of construction and arrangement hereinafter fully described.

In the accompanying drawings, Figure 1 represents a longitudinal section through my improved chuck, with the parts in position clamping a tapering shank. Fig. 2 is a similar view with the shank or bit removed. Fig. 3 is a side elevation of the slotted mandrel. Fig. 4 is an end view, with the outer shell in section and the parts in the position shown in Fig. 1; and Fig. 5 is an end view of Fig. 2. Fig. 6 is a rear end view of the adjustable sleeves, with the mandrel in section; and Fig. 7 shows one of the clamping-jaws in side and outer edge elevations.

A represents the tubular mandrel, provided at its outer end with elongated radial slots $a$ at regular intervals, three being shown; but two, or more than three, may be formed in it for the reception of the radially-moving jaws B. The side walls of the slot, at or near the center of the length of the slots, are grooved at $a'$ to receive and permit the movement in and out with the jaws of guide-pins $b\ b'$, formed upon the sides of or secured to the jaws B. The rear or outer edges of the jaws, directly outside of the pins $b\ b'$, are recessed to receive an angular spring, C, or series of springs uniting in angular form, extending around the slotted mandrel, and secured to the recessed outer edges or outer faces of the jaws B by screws $c'$, or other suitable fastenings. This spring is so arranged that it serves to force the jaws outward for adapting them to receive the bit or shank between them, said spring assuming a form approximating the cylindrical, as shown in Fig. 5, when the jaws are forced inward for the purpose of clamping a bit or shank.

Upon the mandrel A is mounted a sleeve, D, which fits the mandrel closely, and is adapted to move freely endwise, but is held against rotation thereon by means of a set screw, screws, or pins, $d$, passing through a hub or collar, D', on its outer face, the inner ends of said screw or screws entering the slots $a$ in the mandrel, and moving lengthwise of said slots, with the endwise adjustment of the sleeve or collar on the mandrel. The inner face of the sleeve or collar is made flaring at $d'$ to adapt it to act on inclined faces on the adjacent ends of the jaws B, as hereinafter explained, and the periphery of the sleeve, which is cylindrical or annular in form, is provided with a screw-thread, $d^2$, which engages with and is acted upon by a corresponding screw-thread, $e$, formed on the inner face of a cylindrical outer shell or sleeve, E. The outer shell or sleeve, at its outer end, overhanging the slotted open end of the mandrel has an inclined annular flange, E', formed upon it, which converges upon all sides toward and at its inner edge fits snugly around the end of the mandrel, giving it a bearing thereon, as shown, thereby serving as a covering for the sleeve D, the end of the mandrel, and the intermediate space in which the outer faces of the jaws move. The inclined inner walls of the flange E' also serve to act upon inclines on the outer ends of the jaws or dies B, as will now be explained. The jaws are provided near their ends, upon their outer edges, with inclined or cam faces $b^2$ $b^3$, those on the same jaw converging outwardly in such manner as to give increased depth, and consequent strength, to the central portion of the jaws, where it is required. By this arrangement of these inclined faces they are adapted to be acted upon by the flaring wall of the inner face, $d'$, of the sleeve or collar D and the converging annular flange E' of the outer sleeve or shell, E. By this construction described, it will be seen that both the sleeve or collar D and the outer sleeve or shell, E, are adapted to move lengthwise of the mandrel, and that this movement will be effected by the rotation of the outer covering sleeve or shell, E.

When the parts are in the position shown in Figs. 2 and 5, a bit or shank of any usual form, either straight or tapering, the latter being shown at G in Fig. 1, may be readily inserted in the open end of the mandrel between the jaws, which, being pivoted in the mandrel, readily conform themselves to and center the shank, when, by rotating the shell E in the proper direction for drawing the sleeve D and the flange E' toward each other, the inclined walls of said parts will act upon the inclined faces $b^2$ and $b^3$ of the jaws B, and the latter will be forced inward until they are made to firmly grasp and hold the shank of the bit or tool placed between them.

Having now described my invention, I claim as new—

1. In a chuck or tool-holder, the combination, with the mandrel and its clamping jaws or dies, of two sleeves or collars, one mounted and adjustable upon the mandrel, and the other adjustable upon and covering the former and the spaces surrounding the mandrel in which the jaws move.

2. The combination, with the mandrel and its jaws or dies, of two sleeves or collars, one mounted and adjustable upon the mandrel and the other adjustable upon and covering the former and operating to adjust the jaws, substantially as described.

3. The combination, with the slotted mandrel, of the radially-moving jaws B, provided with centrally-located guiding-pins $b$, working within grooves in the side walls of the radial slots in the mandrel, substantially as specified.

4. The combination, with the slotted mandrel and the radially-moving jaws provided with guiding-pins working in grooves in the side walls of the radial slots in the mandrel, of the spring or springs in angular form surrounding said mandrel and jaws, and adapted by the inward movement of the jaws to approximate an annular form, substantially as shown and specified.

5. The combination, with the slotted mandrel, of the radially-moving jaws, the spring surrounding said mandrel and jaws, and the two threaded sleeves surrounding said mandrel and jaws, one mounted upon the mandrel and adapted to be adjusted lengthwise thereon, and the other working over and covering and protecting the former, substantially as described.

6. The slotted cylindrical mandrel, in combination with the jaws provided with centrally-located guiding-pins and outwardly-converging inclines, and two sleeves, one mounted and adjustable upon the said mandrel and the other adjustable upon and covering the former, for the purpose and substantially as described.

7. The combination, with the smooth cylindrical mandrel provided with jaws, having centrally-located guiding-pins working in grooves in the side walls of the radial slots in the mandrel, and having inclines upon their outer edges, of two moving sleeves, one adjustable lengthwise upon the mandrel and the other adjustable upon the former for adjusting the jaws, substantially as described.

8. The combination, with the mandrel and the clamping-jaws provided with the guiding-pins $b$, located centrally thereof and working in grooves in the side walls of the radial slots in the mandrel, of two sleeves having internal inclines working over and upon the correspondingly-inclined outer edges of said jaws, said sleeves being provided, one with an external and the other with an internal screw-thread, the one working over the other for effecting the adjustment of the jaws, substantially as described.

9. The longitudinally-slotted mandrel and the clamping-jaws working loosely therein, and provided with pins or spurs working in grooves in the side walls of the radial slots in the mandrel, and projecting inclines, in combination with two sleeves or collars, both adjustable upon the mandrel and provided with intermeshing screw-threads, adapting them to be simultaneously moved endwise upon the mandrel, one over the other, for effecting the adjustment of the jaws, substantially as specified.

In testimony whereof I have hereunto set my hand this 23d day of November, A. D. 1883.

AUGUSTUS E. ELLINWOOD.

Witnesses:
LEWIS MILLER,
O. L. SADLER.